Figure 4:
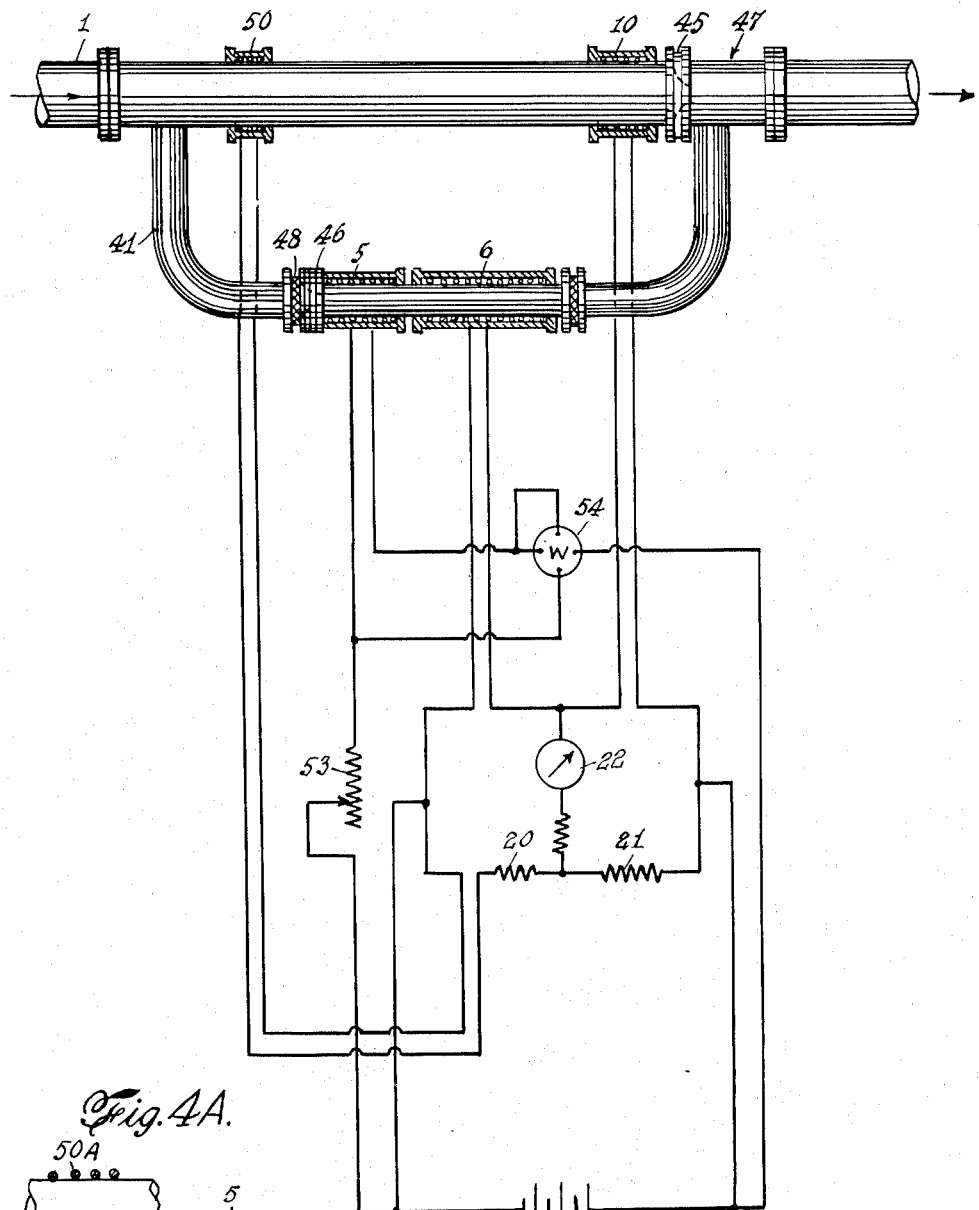

Jan. 10, 1956  J. H. LAUB  2,729,976
THERMAL FLOWMETER
Original Filed May 21, 1946  4 Sheets-Sheet 1
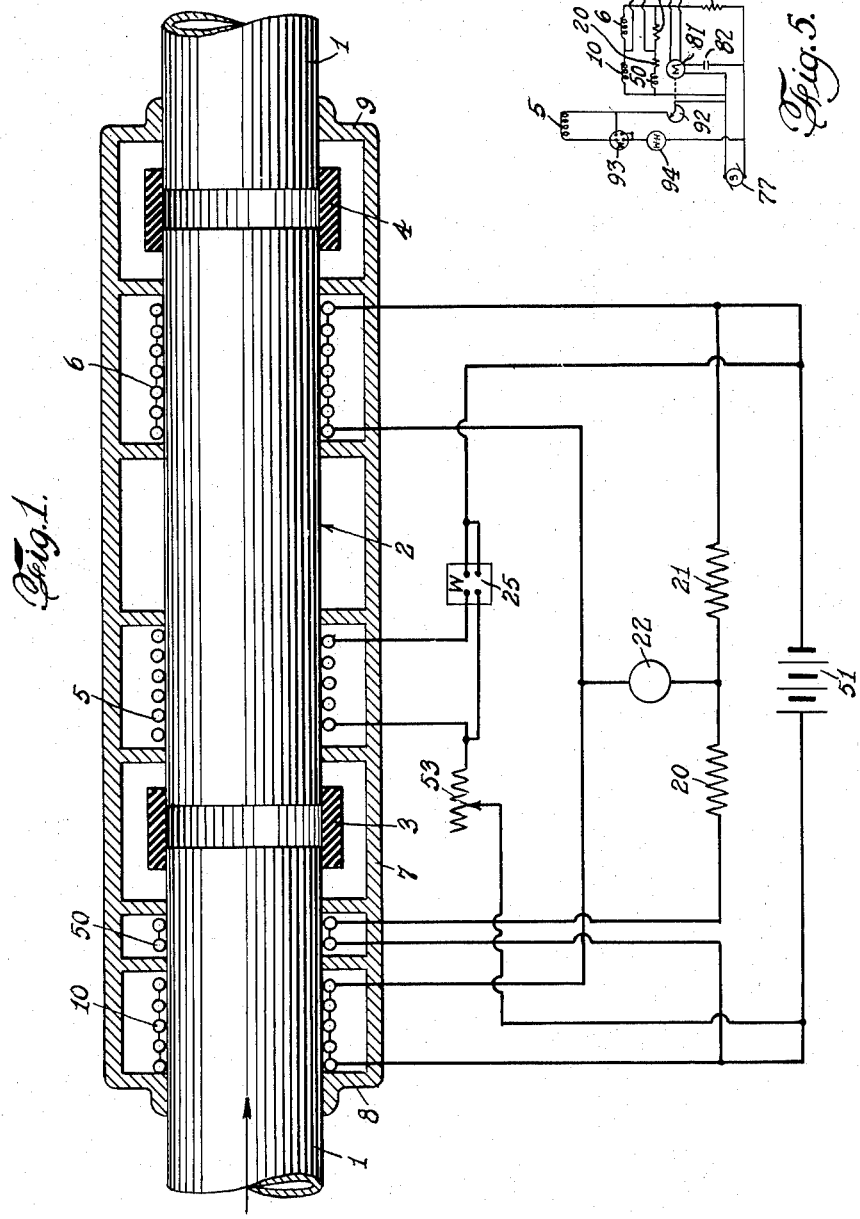
INVENTOR.
JOHN HARRY LAUB
BY
ATTORNEY.

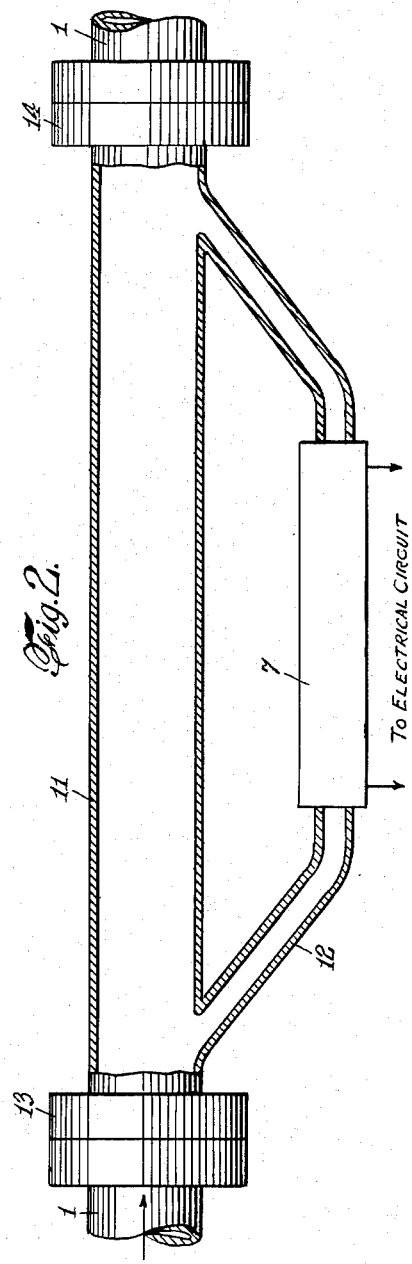
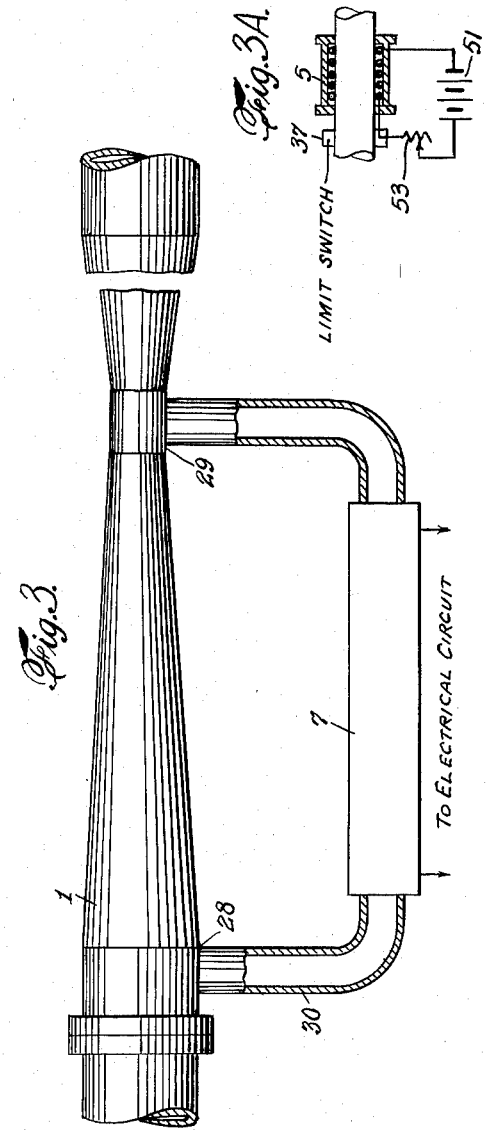

Jan. 10, 1956   J. H. LAUB   2,729,976
THERMAL FLOWMETER
Original Filed May 21, 1946   4 Sheets-Sheet 3

INVENTOR.
JOHN HARRY LAUB
BY
ATTORNEY.

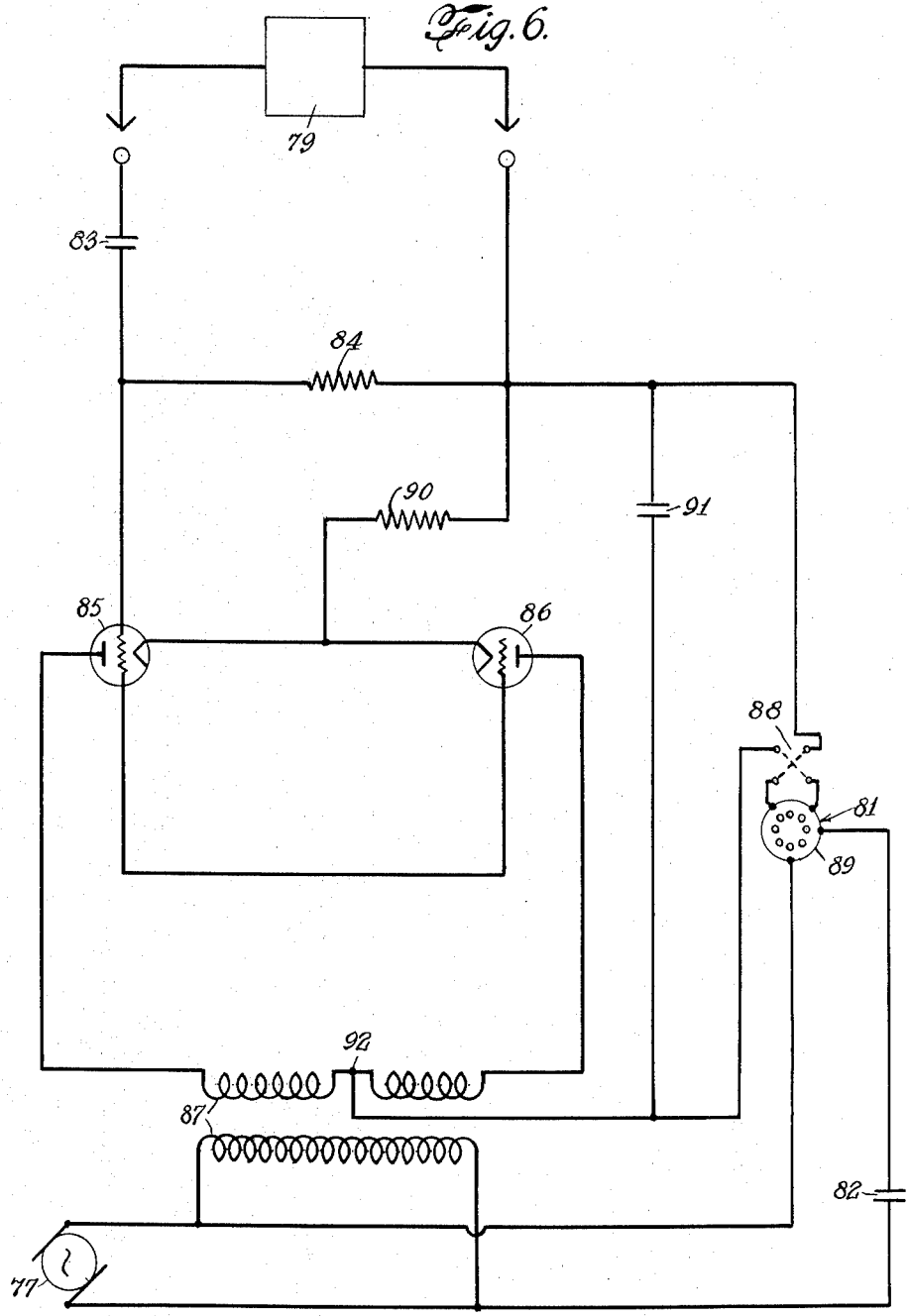

United States Patent Office 2,729,976
Patented Jan. 10, 1956

2,729,976

THERMAL FLOWMETER

John Harry Laub, Short Hills, N. J.

Original application May 21, 1946, Serial No. 671,179. Divided and this application January 6, 1953, Serial No. 329,899

9 Claims. (Cl. 73—204)

This invention deals with flow meters and is concerned in particular with devices for measuring the rate of flow or quantity of flow of a liquid or other medium flowing through a conduit.

Flow meters as heretofore known have been based on mechanical principles such as the measurement of the displacement of an element in which the confined flowing fluid causes such element (e. g. a nutating piston, propeller or vane) to rotate, the number of revolutions being a measure of the quanity of medium flowing through the conduit or pipe line, or on pressure drop occurring in the confined flowing medium passing through a Venturi tube or through an orifice, the pressure drop being a measure of the rate of flow.

The devices of the prior art suffer, however, from a number of shortcomings. The mechanical means injected into the flowing medium affect the free flow thereof and increase the pressure drop across the meter. Great care must be exercised in their construction, often without success, in order to avoid leakage of the medium, e. g. gasoline, ether, chlorine, etc., which may be inflammable, corrosive or otherwise objectionable, and such avoidance of leakage is particularly difficult in meters of the volumetric displacement type where the rotary movement of the displacement element must be transmitted through the housing of the meter by mechanically moving parts. Furthermore, such devices are not always accurate, especially where the flow rate may vary from time to time from a low minimum to a high maximum. Such flow meters are of the direct indicating type and require, where remote indication is desired, special auxiliary devices, e. g. magnetic plungers, electric tachometers, etc., for remote indication. The weight of such meters and the relatively large space required for their installation constitute further shortcomings where, as for instance in airplanes, small weight and small space occupancy are of prime importance. Pressure drop type meters furthermore have a limited range and require special devices, e. g. devices for conversion of the square-root scale characteristic of such meters into a linear scale characteristic. Also flow meters as heretofore known are usually designed for only one purpose and are normally not capable of measuring the rate of flow as well as the total quantity of flow.

There are also known to exist flowmeters operating on the electrocaloric principle or of the "Thomas" type in which the flow is measured by the determination of the effect of a known amount of heat dissipated into a flowing medium. However, the prior known instruments operating on this principle have proven to be commercially unacceptable especially in the measurement of the flow of liquids in that considerable errors in measurement due to fluctuations in fluid temperature, thermal time lags, etc. have not been overcome.

It is one object of this invention to provide a flowmeter operating on the electrocaloric principle which practically removes errors in measurement due to thermal time lags, fluctuations in fluid temperatures, etc. It is another object of this invention to provide an electrocaloric type flow meter which shall be vibration and leak proof and incapable of interfering with the free flow of the confined gaseous or liquid medium and which shall not impede or obstruct the flow thereof. It is a still further object of this invention to provide an electrocaloric type flow meter in connection with the measuring of the flow of gasoline, oil, cooling liquids and other flowing media in airplanes and which is accurate within a wide range of temperatures and supply voltages. It is another prime object of this invention to provide a flow meter capable of measuring the rate of flow of a flowing medium as well as the total quantity of flow thereof. Other objects and advantages of my invention will appear from the description thereof hereinafter following.

Figure 4A:
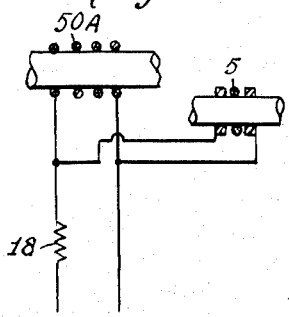

The nature of the flow meter of the invention and its functioning are illustrated in the accompanying drawings, forming part hereof, in which:

Figure 1 represents a schematic illustration of one embodiment of the flow meter of the invention, Figure 2 represents a schematic illustration of a modification of the embodiment of the flow meter of the invention shown in Figure 1, Figure 3 represents a schematic illustration of another modification of the embodiment of the flow meter of the invention shown in Figure 1, Figure 3A represents a modification of the heater circuit of the invention, Figure 4 represents a schematic illustration of still another modification of the embodiment of the flow meter of the invention shown in Figure 1, Figure 4A represents an alternate location of the electrical connection of the temperature compensation coil of the invention, Figure 5 represents a schematic illustration of my invention as operable on A. C. current, and Figure 6 represents a diagram of part of the circuit of the embodiment of Figure 5.

The flow meter of the invention involves the use of a heat exchanger in which a heating or cooling means constitutes one element, and the flowing medium constitutes the other element, heat being transferred to or withdrawn from the flowing medium and the temperature increase or decrease occurring in the flowing medium being measured with respect to a known reference temperature of the flowing medium before passing through the heat exchanger. The flow meter of the invention also provides means for readily transforming and calibrating such temperature increase or decrease in terms of rate of flow of the flowing medium or in terms of quantity of flowing medium, and further includes means for adjusting or compensating for certain errors which might otherwise effect the accuracy of the functioning of the device of the invention. The flow meter of the invention may be operated by D. C. current as well as A. C. current and may be utilized either for the measuring of the rate of flow of a flowing liquid or gas or of the total quantity of flow thereof in any given period of time.

In Figure 1 I have shown a conduit or pipe 1 through which the liquid or gaseous medium flows. This conduit or pipe line 1 contains a pipe section 2 of material of high thermal conductivity, i. e. e. g. metal of high specific heat conductivity and low specific heat, such as copper, silver, aluminum, etc., spaced and heat insulated from the adjacent sections of the line by spacers or sections 3 and 4, which are advantageously formed of material of low thermal conductivity such as rubber, Bakelite, synthetic rubber, e. g. neoprene, ceramic material, or the like. Heat is transferred to the flowing medium through this heat conductive section 2 by means of a heater coil 5 wound on the outside of a portion of the section 2. This heater coil 5 may be formed of any suitable resistance element, e. g. a wire or ribbon of such metals or alloys as Nichrome, manganin, constantan, etc. A resistance thermometer 6 consisting of a coil of thermo-responsive wire or ribbon is wound on the outside of section 2. The heater coil 5 precedes the thermometer coil 6 in the direction of the flow of the medium involved. Both coils may be protected against ambient temperature effects by means of a tubular housing 7, including end covers 8 and 9, the latter being in intimate thermal contact with the conduit 1. Wound on the conduit or pipe 1, at a point before the flowing medium reaches the heat exchange section 2, is a reference resistance thermometer 10. The resistance thermometers 6 and 10 may be of the usual type involving coils of wire or ribbon constructed of a material the temperature coefficient of electrical resistance of which is high and reproducible, e. g. platinum or alloys of precious metal or nickel. A temperature compensating coil 50, as fully explained hereinafter is also mounted on pipe 1 (see the description of Figure 4). The windings of the resistance coils are wound in intimate thermal contact with the conduit. If insulated resistance wire is used the windings may be in direct contact with the surface of the metal conduit; otherwise a further thin coating of insulating lacquer should be interposed between the metal conduit and the bare wire.

The operation of the device of Figure 1 is more fully explained hereinafter in connection with the description of Figure 4.

The difference in temperature between that of the flowing medium before reaching the heat exchanger and that of the flowing medium after leaving the heat exchanger is a function of the specific heat of the flowing medium, of the quantity of heat transferred in the exchange, and of the rate of flow of the flowing medium. If heat energy is introduced into a medium flowing within a conduit and its temperature measured before and after the heat exchange, the differential temperature $\Delta t$ between the two readings will vary with the rate of flow. It will be small for high flow rates and large for low flow rates and if in such case the quantity of heat transferred to the flowing medium is taken as "Q," in terms of gram calories per second; the specific heat of the flowing medium is taken as "$c$"; the quantity of flowing medium, in terms of grams per second, is taken as "M"; and the temperature rise, in terms of degrees C., is taken as "$\Delta t$," the relationship of the various factors may be expressed in a formula as follows:

$$\Delta t = \frac{Q}{cM} (°C.) \quad (1)$$

and if the wattage input W to a heater coil is proportional to Q the equation becomes:

$$W = cM\Delta t \quad (2)$$

and $$M = \frac{1}{c} \frac{1}{\Delta t} W \quad (3)$$

Consequently as long as the specific heat of the flowing medium does not vary and the quantity of heat transferred is kept constant, i. e. are known and constant, the temperature differential is inversely proportional to the rate of flow to be measured, so long as the heat transferred is carried away by the flowing medium by storing it and conveying it to places of different temperature. Likewise, if the temperature increment and the specific heat of the flowing medium are constant the quantity of heat transferred is directly proportional to the rate of flow of the flowing medium.

It will be understood that instead of measuring the temperature rise in the flowing medium caused by transfer of heat thereto I may measure the temperature drop caused by withdrawal of a given amount of heat from the flowing medium. In this case the heat exchanger would embody an external cooling element instead of an external heater, e. g. in the form of a refrigerant.

The principle utilized in the flow meter of the invention involves, therefore, as one aspect thereof the measurement of the temperature change, occurring in the flowing medium after passing through a heat exchanger with the quantity of heat transferred being kept constant and the change being inversely proportional to the rate of flow, or the measurement of the amount of heat transfer with the temperature change being kept constant and the quantity of heat transfer being directly proportional to the rate of flow.

Referring further to Figure 1, the resistance thermometers 6 and 10 are connected to a Wheatstone bridge, shown schematically in Figure 1 as including fixed resistances 20 and 21 and a measuring instrument 22 in the diagonal of the bridge adapted to measure the temperature differential between such thermometers. If the temperature gradient between the thermometers 6 and 10 is kept constant and the wattage input to the heating coil 5 is varied by a means 53, the wattage input to such heating coil 5 will be proportional to the rate of flow in the line, and a watt meter 25 connected into the circuit of the heater coil 5 can be calibrated to read the rate of flow. Or, the wattage input to the heater coil 5 may be kept constant, in which case the temperature differential between the thermometers 6 and 10 will be inversely proportional to the rate of flow.

All component parts entering into the measurement of the rate of flow of the flowing medium are located outside the conduit containing the flowing medium and there are no movable parts inserted into the flowing medium itself. There is, therefore, no obstruction which might stop or impede or in any way interfere with the free flow of the liquid or other medium involved. The construction does not embody any bushings or bearings through which any part of the flowing medium might leak out. The circuit elements employed for carrying the electrical current are separated from the flowing medium by the walls of the conduit, thus avoiding any possibility of ignition or explosion of the medium. There are no obnoxious or toxic fumes which might otherwise escape from the conduit or pipe line. The embodiment of Figure 1 illustrates the application of my invention to a straight conduit.

Figure 2 of the drawings illustrates the application of the flow meter of the invention, wherein a bypass arrangement may be used, if desired, with a view to requiring limited quantities of power input for the heat exchanger and yet producing a sufficiently high temperature gradient to assure dependable accurate results.

In Figure 2 I provide a bypass conduit, whereby a portion only of the flowing medium is transmitted through the heat exchanger and is thus subjected to the measuring process, which said portion is in a fixed relation to the total quantity of the flowing medium. The bypass conduit may be inserted into the flow conduit 1 of Figure 1 as a unit and in such case consists of a normal flow conduit section 11 and the bypass conduit section 12. This device may be connected to the regular line 1 by means of fittings 13 and 14. The stream of the flowing medium is thus divided into one relatively large stream flowing through the main conduit section 11 and one relatively small stream flowing through the bypass section 12.

The principles of the flow meter measuring system previously described in connection with Figure 1 are then applied to the relatively small bypass stream flowing through the section 12 and correlated with the relatively large stream flowing through conduit 11. I thus produce a heat exchanger forming part of the bypass transmitting section 12 and corresponding to the housing 7 of Figure 1 which is electrically arranged as shown in Figure 1.

The flow through the bypass section 12 is caused by the pressure drop between the inlet and outlet of the bypass section 12. In the embodiment illustrated in Figure 2 this pressure drop is relatively small unless the distance between the inlet and the outlet points is made sufficiently long which can be done in most but not all installations.

In Figure 3 I have illustrated another embodiment of my invention similar to that of Figure 2 but adapted to maintain a sufficiently large and well defined pressure drop between the inlet and the outlet of the bypass section or line while yet keeping the total length of the device as short as possible. In this case the main conduit 1, or an inserted section thereof, is built as a Venturi tube and the bypass section line is provided with its inlet opening at a point ahead of the taper of the Venturi tube, e. g. at 28, and its outlet opening at the narrowest part or the throat of the Venturi tube, at 29. The bypass line 30 is similar to the bypass conduit 12 of Figure 2 and a section thereof intermediate its length is provided with the housing 7 containing the heat transfer elements shown in Figure 1 which is electrically arranged as shown in Figure 1.

In any of the embodiments of the invention there may be connected, as schematically shown in Figure 3A, in series with the heater coil, a limit switch 37, the contacts of which are normally closed, thereby permitting current to flow to the heater coil 5. The contacts of this limit switch can be caused to open when an unwanted limiting condition of the fluid adjacent the heater coil occurs, e. g. an undesirably high temperature or low flow rate of the fluid. In the event the criterion is the temperature of the fluid then the switch 37 may be any of the thermostatic switches which are per se well known in the art. Such a thermostatic switch is adjusted so that if the temperature of the pipe section in the neighborhood of the heater exceeds a predetermined value, the contacts of the switch 37 are opened automatically. Such a switch is preferably of the bimetallic thermostatic type and may consist of a strip of bimetallic metal wound or coiled around the conduit. This arrangement is especially desirable where the flowing medum being measured has a high vapor pressure at room temperature or is otherwise capable of evaporating easily. For instance, in the case where gasoline is the flowing medium, the temperature at very low flow rates, or at zero flow rate, might otherwise become so high as the result of the operation of the heater that a vapor lock might form which would obstruct the flow of the gasoline through the bypass conduit or that bubbles might develop in the gasoline which would make the flow of the gasoline irregular. Such a thermostatic switch not only interrupts or controls the current to the heater in the case of such excessive heat development, but is also adapted to protect the measuring instrument measuring the temperature difference between the resistance thermometers against overload at small flow rates. In the event the criterion is the flow rate of the fluid then the switch 37 may be any of the flow actuated switches which are per se well known in the art, in which the switch remains closed only so long as the flow rate in the pipe exceeds a predetermined flow rate, but when the flow rate drops below this value the contacts of the switch are opened automatically. This arrangement is also desirable in the case where gasoline is the flowing medium since, as indicated above, at very low flow rates, or at zero flow rate, the heater may raise the temperature of the gasoline to a point where a vapor lock occurs or bubbles are formed. Also, such a flow switch protects the measuring instrument measuring the temperature difference between the resistance thermometers against overload at small flow rates.

Such a flow actuated switch is shown for example in U. S. Pat. 2,600,011.

The Venturi tube construction shown in Figure 3 produces in known manner the required pressure drop, or loss in the static head, to cause a controlled flow of part of the flowing medium through the bypass line 30, as a result of the change in the velocity of the flowing medium between the widest point of the tube, indicated at 28, and the narrowest part of the tube or throat 29. This pressure drop can be controlled by the diameter of the entrance to the Venturi tube.

The range of flow covered by the flow meter can be changed by changing the wattage input to the heater.

Figure 4 illustrates another embodiment of the flow meter of the invention in which a high pressure drop in the flow conduit is obtained by inserted orifices or flow nozzles instead of by means of a Venturi tube arrangement. The main conduit 1 is again tapped by a bypass conduit 41 similar to that shown in Figures 2 and 3. The bypass conduit is provided with the heater 5 and the differential between the temperature in the main conduit and the temperature in the bypass line is measured by thermometers 10 and 6, respectively. In this embodiment I provide orifices or flow nozzles in the main conduit and in the bypass line. The orifice 45 in the main conduit is provided intermediate the bypass inlet and outlet, and preferably close to the bypass outlet, as indicated. A similar orifice or flow nozzle 46 may be provided in the bypass line 41. The orifices or nozzles are preferably inserted in flange connections 45 and 48 respectively, so that they are easily replaceable, e. g. for calibration purposes, and so that they are exchangeable for orifices of different dimensions to change the sensitivity of the flow meter by changing the ratio of the bypass flow to the main flow. By using specially designed tapered nozzles or orifices such as those described by W. Koennecke in Archiv für Technisches Messen V, 1242-2, January 1939, a pressure drop can be obtained between the inlet and the outlet which is practically constant within a wide range of Reynolds numbers. As the Reynolds number characterizing the condition of a flowing medium, varies considerably when the viscosity of the fluid varies with the temperature thereof, I may use a nozzle or orifice of such special design, as e. g. the "quarter-circle" type described in the Archiv, which produces a constant pressure drop for widely varying conditions of flow such for instance as may be caused by changes in the temperature of the flowing medium. By suitable combination of such orifices or nozzles in the main conduit 1 on the one hand and in the bypass line 41 on the other hand, it is possible to make the ratio of flow in the two lines sufficiently constant for a wide range of temperatures, thus avoiding the introduction of occurrence of temperature errors. However, other nozzles or ordinary orifices may of course be used.

Varying fluid temperatures may effect the accuracy of flow measurements and my invention encompasses a method of temperature compensation. Normally the thermometer arms are made of material having a high temperature coefficient of electrical resistance, such as nickel wire, and their resistance changes equally if the temperature of the flowing medium or of the ambient air changes, and the equilibrium of the Wheatstone bridge is thus maintained. Ordinarily, however, sizeable temperature error is left, e. g. due to a change in the flow ratio between the flow in the main conduit and the flow in the bypass conduit or the change in the specific heat of the flowing medium with varying temperature, etc. For example, referring to the Equation 2 above, it is seen that the quantity of heat W transferred to the fluid is directly proportional to the flow rate M as long as the specific heat of the fluid remains constant. However, for most liquids the specific heat varies somewhat over a wide range of temperatures. Furthermore we have to consider the effect of temperature on the viscosity of the fluid, which increases for gases and decreases for liquids with increased temperature. This affects the character of the flow and the mechanism of the heat transfer between the coils and the fluid. It is readily recognizable that the local velocity of a fluid within a conduit is by no means uniform and that since the velocity distribution is governed by the Reynolds number which is inversely proportional to viscosity it is, therefore, a function of fluid temperature. It is obvious, therefore, that the heat transfer from the wall to the fluid is affected by the character of the flow in the neighborhood of the wall or by boundary layer conditions, that is, by the temperature of the fluid. Hence, when the fluid temperature varies, considerable error may be introduced into the instrument. These problems were non-existant in known types of calorimeter flowmeters where the resistance elements have been mounted within the flow conduits. Moreover, those types of flowmeters which do mount the temperature sensitive elements wound around the outside of the flow conduit, such as that described in the Swedish patent to J. P. Lutz, published on June 2, 1942, recognize that such an instrument as previously known required as a condition for accuracy in measurement that the fluids whose flow is to be measured exhibit constant values of specific heat, density, composition, temperature and a constant degree of turbulent flow. My invention, therefore, enables such calorimetric devices as shown by Lutz to be applicable in accurately measuring the flow of any fluid by removing all errors due to temperature fluctuations.

Such errors and other errors due to unknown transient conditions which depend on temperature variations can be compensated for by making one of the remaining arms of the bridge (e. g. arm 20, which normally would be made of manganin or similar wire the resistance of which does not vary with temperature) slightly sensitive to temperature as by adding thereto a small section of a wire coil 50 of nickel or other temperature sensitive material whose resistance increases with increase in temperature, wound on the conduit 1 so as to be responsive to and subject to its temperature, whereby the Wheatstone bridge indicates unbalance only as the result of a change in the rate of flow of the flowing medium.

Another method of compensating for any residual temperature error is to shunt the heater coil (consisting of wire the resistance of which does not vary with temperature) with a bypass coil 50a similar to coil 50 described above so that with raising temperature the shunt resistance will increase and a larger share of the wattage will go into the heater coil as shown in Figure 4A. In this instance a thermoconstant resistance 18 is connected in series with the source of E. M. F. and the heater. This arrangement may be substituted for the bridge connected coil in any of the embodiments of the invention.

As shown in Figures 1 and 4, the resistance thermometers 6 and 10 are connected to a Wheatstone bridge supplied with power from the battery 51. The signal output of the bridge is normally zero but if the flow rate in the main flow conduit 1 changes, a signal will be produced by the bridge and the measuring instrument 22 in the bridge diagonal will show a deflection from zero in one direction or the other, depending upon whether the rate of flow in the conduit 1 is increasing or decreasing. Such a measuring instrument is per se well known in the art and may be a simple null indicator which is read by the operator who then manually adjusts the wattage input to the heater by operating the rheostat 53 which is connected in series with the heater coil 15 and the power supply 51. The bridge signal is thus restored to zero by increasing or decreasing the wattage input to the heater coil. The measuring instrument 22 may also be a controlling galvanometer or a null relay which is equipped with "high" and "low" contacts and is also per se well known in the art. Such an automatic controller or controlling galvanometer is used to control the power input to a reversible speed motor which drives the rheostat, i. e. rheostat 53 in Figure 4, to decrease or increase the wattage input to the heater, in a manner which is per se well known in the electromechanical controls art, e. g. the arrangement for the controlling galvanometer can be analogous to that shown schematically in Figure 5 for use with an electronic controller.

Frequently it is desirable to measure not only the rate of flow but also the integrated flow, i. e. the total quantity of the medium flowing through the conduit over any specified period of time. Referring to the Formula 3 previously stated, it will be noted that by integrating both sides of the equation over time the equation becomes:

$$\int M dr = \frac{1}{c} \frac{1}{\Delta t} \int W dr \qquad (4)$$

if $r$ denotes the time.

The left side of Equation 4 represents the totalized flow which is seen to be proportional to the watt hour consumption of the heater. The watt hour consumption of the heater can be measured with a watt hour meter in the heater circuit, which can be calibrated to read the integrated flow directly in pounds or gallons. One example of useful application of the flow meter of the invention as a measuring device for the total integrated flow is the measurement of the flow and consumption of gasoline, e. g. in aircraft engines, so that the pilot can check not only the rate of consumption of gasoline at any time but also the total consumption up to any given time, whereby the safety, speed and economy of air travel can be greatly increased.

In Figure 5 I have illustrated a flow meter according to the invention designed for and operating specifically on alternating current. The modification illustrated in Figure 5 also describes automatic control of the wattage input to the heater by means of an electronic controller in place of the sensitive relay or galvanometer type controller previously referred to.

In this embodiment I have not shown the coils mounted in any special relationship on the conduit since the coils 5, 6, 10 and 50 perform the same functions and may be mounted on any of the conduit arrangements shown in the previous illustrations. The resistance thermometers 6 and 10 form two arms of a Wheatstone bridge, which is completed by two other fixed resistor arms 20 and 21 and the temperature error compensating means 50 is shown as connected into the arm 20. The Wheatstone bridge is connected through a series resistance 76 of thermo-constant material to a source 77 of alternating current of any conveniently available frequency and voltage. The output diagonal of the Wheatstone bridge is connected to the primary side of a transformer 78 whose secondary side is connected to an electronic voltage amplifier 79. Such amplifier 79 may consist for instance of a number of resistance coupled triodes connected in series and designed to amplify the relatively weak signal from the Wheatstone bridge to a voltage sufficiently high to drive the grids of a power amplifier 80 which forms the second stage of the electronic amplifier. Any conventional type of electronic power amplifier can be used, a preferred example comprising triodes operating in parallel and resulting in an output current sufficiently large to energize one coil of a two phase reversible induction motor 81 the second phase of which is connected to the A. C. power source 77 by means of a capacitor 82. The power amplifier 80 is designed at the same time to act as a phase discriminator, shifting the phase of its output current 180° if the voltage signal from the Wheatstone bridge goes through zero and shifts its phase 180°, which will occur every time the bridge goes through its balance condition from an overbalanced to an underbalanced condition or vice versa. Figure 6 illustrates such phase discriminating circuit for the power amplifier 80 of Figure 5. The voltage amplifier 79 is applied across the condenser 83 and the resistor 84 both of which are connected in series. The plates of the two triodes 85 and 86 respectively, or of sets of triodes connected in parallel are connected to the secondary winding of the transformer 87 the primary of which is connected to the A. C. power source 77. The center tap 92 of the secondary winding of the transformer 87 is connected to one coil 88 of the two phase induction motor 81, the second phase of which, 89, is connected to the A. C. current source 77 by means of the condenser 82. The cathodes of the two triodes or sets of triodes 85 and 86, respectively, are connected in parallel and through resistor 90 to the other end of phase 88 of the motor 81. Condenser 91 is connected in parallel to this phase 88. The circuit described has phase-discriminating characteristics, so that if the phase of the incoming voltage signal applied across the combination of condenser 83 and resistor 84 shifts 180° the phase of the current through the coil 88 of the motor 81 will simultaneously shift 180°. Since, however, the phase of the current in coil 89 of the motor 81 is fixed in relation to the phase of the A. C. power supply 77 the end result of a phase shift in coil 88 will be a change in the direction of rotation of the motor 81.

As shown in Figure 5 the motor 81 is mechanically coupled through a gear train to a movable contact of a variable rheostat 92 which is in series with the heater coil 5 and the A. C. power source 77. Also in series with the heater coil 5 are an A. C. watt meter 93 and, if desired, an A. C. watt hour meter 94. The current through the heater coil 5 and meters 93 and 94, respectively, is controlled by the position of the movable contact of rheostat 92. If, therefore, the Wheatstone bridge becomes unbalanced due to a change in flow conditions in the conduit an A. C. signal will be produced in the output diagonal of the bridge, amplified in voltage amplifier 79 and power amplifier 80, and will be transmitted finally to the motor 81 which, therefore, will begin to rotate and adjust the resistance of the rheostat 92 until balance is restored and the signal from the Wheatstone bridge disappears. If flow conditions change in the opposite direction an A. C. signal will likewise be produced in the output diagonal of the Wheatstone bridge, the phase of which in this case is shifted 180°, and a current of the same shift in phase in coil 88 of the motor 81 will be produced, causing the motor 81 to rotate in the opposite direction. The electronic controller will thus keep the bridge in balance under any and all flow conditions in the transmitting conduit. The amount of wattage required to maintain the bridge in balance is, as explained previously, indicative of the flow rate.

The electronic controller illustrated in Figures 5 and 6 possesses much higher sensitivity than the contact making relay or the galvanometer type controller, so that with the use of such electronic controller it is possible to still further reduce the size and thermal mass of the components of the flow meter, thus reducing to a negligible amount any time lag caused by such components. The resultant reduction in time lag assists greatly in the elimination of hunting and oscillation of the automatic control.

This application is a division of my prior filed application Serial Number 671,179, filed on May 21, 1946, now abandoned.

It will be seen, therefore, that I have provided a highly efficient flow meter for the measuring of the rate of flow or of the quantity of flow of flowing media in a confined conduit, operable on D. C. or A. C. current, without any interference with the free flow of the flowing medium and which eliminates errors due to fluctuations in the temperature of the fluid.

What I claim is:

1. A flow meter for measuring the flow of a confined flowing medium comprising conduit means, heating means externally contacting a portion of said conduit means to enable transmission of heat energy through said conduit means to said flowing medium, a first temperature responsive means externally contacting said conduit means and so located as to be responsive to the temperature of the flowing medium prior to the transmission of heat thereto, a second temperature responsive means externally contacting said conduit means and so located as to be responsive to the temperature of the flowing medium after the transmission of heat thereto, a bridge having a pair of fixed resistance ratio arms, the other arms consisting of said first and second temperature responsive means and constituting the thermometer arms of the bridge, an electrical circuit comprising a first and a second portion, said first portion consisting of said thermometer arms, said second portion including said ratio arms and the heating means, means arranged in the diagonal of said bridge for sensing any unbalance therein as produced by the said temperature responsive means, and a compensating element externally wound in intimate thermal contact with said conduit means on a portion thereof containing flowing medium unheated by said heating means so as to be responsive to temperature fluctuations of the flowing medium prior to the transmission of heat thereto, the compensating element and temperature responsive means being in the same thermal transfer relationship with the flowing medium, said element being electrically connected into the second portion of said circuit whereby any sensing errors due to fluctuations in the temperature of the flowing medium are compensated for by a shifting of the bridge balance and a signal is produced only as the result of a change in the rate of flow.

2. The flow meter of claim 1 wherein the thermometer arms of the bridge are resistors made of a material having a high positive temperature coefficient of electrical resistance, said ratio arms constituting a pair of resistances of a material the resistance of which does not vary with temperature, and said compensating element is electrically connected in series with one of the fixed resistance ratio arms.

3. The flow meter of claim 1 wherein the heating means consists of a coil of wire the resistance of which does not vary with temperature and the compensating element is electrically arranged to shunt the heater coil and is of a material the resistance of which varies with temperature, whereby upon the said temperature fluctuations occurring in the flowing medium the shunting element automatically operates to vary the wattage input to said heater coil to reduce to zero the signal of said bridge so that it will only produce a signal as the result of a change in the rate of flow of the flowing medium.

4. The flow meter of claim 1 wherein the conduit means consists of a main conduit and a smaller branched bypass conduit interconnected with said main conduit at least said heating means and said second temperature responsive means being located on the branched bypass conduit.

5. The flow meter of claim 4 wherein the main flow conduit is provided with a flow restricting means so located in relation to the exit junction of said bypass conduit as to produce a head in said main conduit and the first temperature responsive means is located on the main flow conduit prior to the flow restricting means.

6. The flow meter of claim 1 wherein said electrical circuit includes a variable power supply means connected to said heater, said sensing means in the diagonal of said bridge being a controller means including an electric motor interconnected to vary the power output of said variable power supply means, said controller means being responsive to signals produced by said bridge whereby said motor operates in connection with said power supply means to vary the current input into said heating means to restore to zero the signal of the bridge, and power consumption recording and indicating means connected in series with said heating means to indicate and record the amount of power required to maintain the bridge balance.

7. The flow meter of claim 1, including a limiting switch means which is normally in closed position, electrically connected to be in series with the heating means, and responsive to a predetermined limiting condition of the fluid adjacent to the heater means to open the circuit to the heating means and discontinue the flow of power thereto when said predetermined limiting condition is reached.

8. The flow meter of claim 1, including a normally closed thermostatic switch means which is electrically connected to be in series with the heating means, and responsive to a predetermined temperature level of the fluid in said conduit adjacent to the heating means, whereby when said temperature level is reached the switch means operates to open the circuit to the heating means and discontinue the flow of power thereto.

9. The flow meter of claim 1, including a normally closed flow responsive switch means which is electrically connected to be in series with the heating means, and responsive to a predetermined flow rate level of the fluid in said conduit adjacent to the heating means, whereby when said flow rate level is reached the switch means operates to open the circuit to the heating means and discontinue the flow of power thereto.

References Cited in the file of this patent

UNITED STATES PATENTS

| | | |
|---|---|---|
| 1,222,492 | Thomas | Apr. 10, 1917 |
| 1,261,086 | Wilson et al. | Apr. 2, 1918 |
| 2,067,645 | Pinkerton | Jan. 12, 1937 |
| 2,176,502 | Kurth | Oct. 17, 1939 |

FOREIGN PATENTS

| | | |
|---|---|---|
| 104,663 | Sweden | June 2, 1942 |